United States Patent
Iwahashi

[11] Patent Number: 6,134,525
[45] Date of Patent: Oct. 17, 2000

[54] IDENTIFICATION-FUNCTION CALCULATOR, IDENTIFICATION-FUNCTION CALCULATING METHOD, IDENTIFICATION UNIT, IDENTIFICATION METHOD, AND SPEECH RECOGNITION SYSTEM

[75] Inventor: Naoto Iwahashi, Kanagawa, Japan

[73] Assignee: Sony Corporation, Tokyo, Japan

[21] Appl. No.: 09/176,138

[22] Filed: Oct. 21, 1998

Related U.S. Application Data

[62] Division of application No. 08/710,941, Sep. 24, 1996, Pat. No. 5,828,998.

[30] Foreign Application Priority Data

Sep. 26, 1995 [JP] Japan .................................. 7-247890

[51] Int. Cl.[7] .................................................. G10L 15/14
[52] U.S. Cl. ........................................ 704/236; 704/240
[58] Field of Search ................................. 704/231, 236, 704/239, 240, 243, 244

[56] References Cited

U.S. PATENT DOCUMENTS

| | | | |
|---|---|---|---|
| 5,638,486 | 6/1997 | Wang et al. | 704/236 |
| 5,737,489 | 4/1998 | Chou et al. | 704/256 |
| 5,749,072 | 5/1998 | Mazurkiewicz et al. | 704/275 |
| 5,754,681 | 5/1998 | Watanabe et al. | 382/159 |

*Primary Examiner*—Richemond Dorvil
*Assistant Examiner*—Angela A. Armstrong
*Attorney, Agent, or Firm*—Jay H. Maioli

[57] ABSTRACT

A discriminant or identification function is used for pattern recognition in which the highest performance can be offered when adaptation is made. Learning is carried out while a discriminant or identification function is adapted to a learning sample. For example, a standard pattern of the character "A" used as an identification function is learned such that when the character "A" slanting in the right or left direction is input, the standard pattern of the character "A" is rotated (adapted) in accordance with the slanting of the input learning sample.

4 Claims, 7 Drawing Sheets

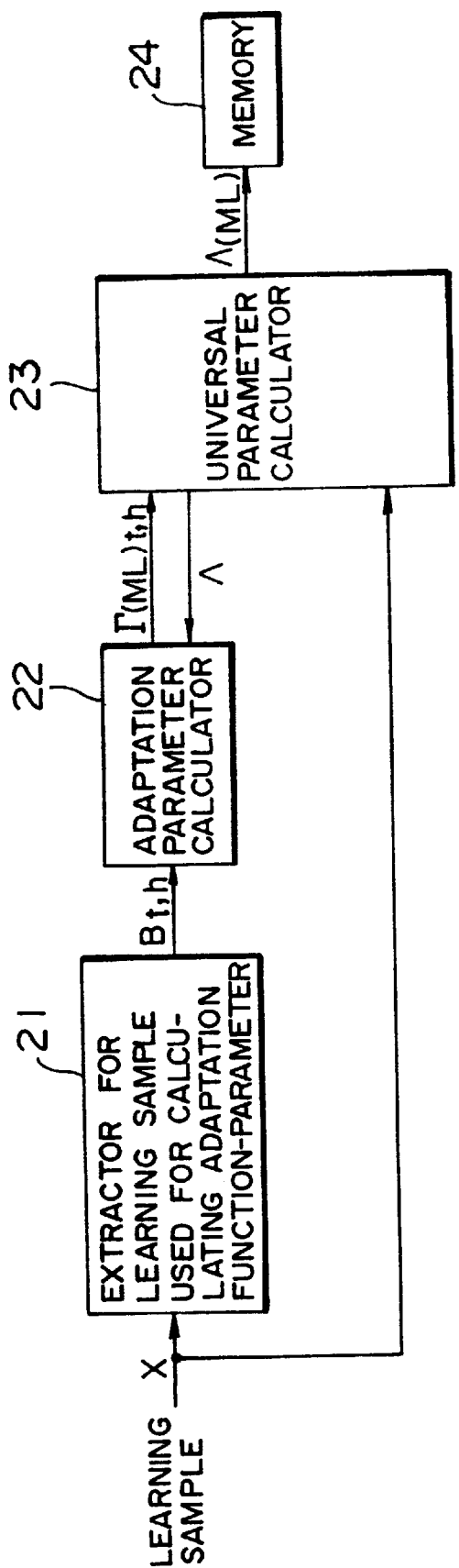

IDENTIFICATION-FUNCTION CALCULATOR, IDENTIFICATION-FUNCTION CALCULATING METHOD, IDENTIFICATION UNIT, IDENTIFICATION METHOD, AND SPEECH RECOGNITION SYSTEM

This is a division of prior application. Ser. No. 08/710,941 filed Sep. 24, 1996 now U.S. Pat. No. 5,828,998.

BACKGROUND OF THE INVENTION

1. Field of the Invention

The present invention relates generally to a discriminant or identification-function calculator, a discriminant- or identification-function calculating method, a classification or identification unit, a classification or identification method, and a speech recognition system. More particularly, the invention relates to an identification-function calculator, an identification-function calculating method, an identification unit, an identification method, and a speech recognition system, all of which are suitable for performing pattern recognition, for example, speech recognition and image recognition.

2. Description of the Related Art

For example, pattern recognition, such as speech recognition and image recognition, is performed in such a manner that feature or characteristic vectors are extracted from input patterns, and the values of the discriminant or identification functions are calculated using the characteristic vectors as input values. The identification functions are used for classifying the input characteristic vectors under a predetermined number of classes. The number of functions are equal to or greater than the number of classes. The class corresponding to the greatest value of the identification functions with respect to the input characteristic vectors is output as the recognition result (classification result).

For performing pattern recognition, high recognition performance is desirably obtained regardless of a change in the state of variation factors. Hence, hitherto, the learning of the identification functions for performing pattern recognition are carried out by use of learning samples including a large number of variations. More specifically, for performing, for example, speech recognition, learning is conducted by use of speech data including a large number of variations as learning samples so as to obtain identification functions (for example, phoneme-discriminant functions when phoneme recognition is carried out) sufficiently resisting a change in the state of speech-variation factors, such as the sound-making environments, the speakers, the characteristics of the input apparatus systems (for example, the characteristics of the microphones and the analog-to-digital convertors for converting the outputs from the microphones). The aforementioned learning method is described in, for example, *Speech Recognition with Probabilistic Models* by Seiichi Nakagawa, the Institute of Electronics, Information and Communication Engineers, and *Context-Dependent Phonetic Hidden Markov Models for Speaker-Independent Continuous Speech Recognition* by KAI-FU, IEEE Transaction on ASSP VOL.38, NO.4,April 1990.

Referring to FIG. 7 illustrating the configuration of a typical conventional identification-function calculator, a great number of learning samples are input into an identification-function calculator 51 in which an identification function, i.e., a parameter representing (forming) the identification function, is determined based on the learning samples.

However, satisfactory recognition performance cannot be always ensured by use of the identification function obtained through the aforedescribed learning method. For better recognition performance, a method is available, for example, for adapting the identification functions to the states of speech variation factors during recognition. A method is available for adapting, for example, the phoneme-discriminant functions, to the speaker is disclosed in, various technical literature, such as *A Study on Speaker Adaptation of the Parameters of Continuous Density Hidden Markov Models* by Chin- Hui Lee, et al., IEEE, Transaction on signal processing, VOL.39, NO.4, 1991, and *Fast Speaker Adaptation for Speech Recognition Systems* by F. Class, et al., Proceedings of IEEE ICASSP, pp. 133–136, 1990.

Hitherto, learning is carried out in such a manner that the identification functions are determined regardless of the aforementioned adaptation method employed during recognition. Namely, the identification functions are determined based on the standards in which the highest performance can be offered when speech adaptation is not made. Consequently, optimum adaptation cannot be always made during recognition even by use of the identification functions determined by the above-described technique. This makes it difficult to significantly improve the identification or accuracy (recognition accuracy) even though adaptations are made.

SUMMARY OF THE INVENTION

Accordingly, in view of this background, it is an object of the present invention to provide a significant improvement in identification accuracy (recognition accuracy) achieved by performing optimum adaptation for conducting pattern recognition.

In order to achieve the above object, according to an aspect of the present invention, there is provided a discriminant- or identification-function calculating method for calculating a classification or identification parameter that forms a discriminant or identification function used for classifying an input characteristic or feature vector under one of a predetermined number of classes, the identification parameter being obtained by applying a fixed identification parameter independent of a predetermined variation state and a maximum-likelihood adaptive discriminant function or adaptation parameter to an adaptation function used for transforming the identification function, the maximum-likelihood adaptation parameter being an adaptation parameter that maximizes the likelihood with respect to a signal sample in the predetermined variation state on the condition that the adaptation function is used, the fixed identification parameter being obtained by a learning method which comprises: a first step of determining learning maximum-likelihood adaptation parameters that respectively maximize the probabilities of generating learning samples in a plurality of variation states of the input characteristic vector on the condition that the adaptation function is used for the variation states; a second step of calculating the likelihood of the fixed identification parameter with respect to all of the variation states according to the learning maximum-likelihood adaptation parameters and the fixed identification parameter obtained through learning which has been previously performed; a third step of determining as to whether the calculated likelihood is equal to or greater than a predetermined threshold; and a fourth step of using as a learning value the fixed identification parameter whose likelihood is equal to or greater than the predetermined threshold.

According to another aspect of the present invention, there is provided an identification unit comprising: an input section for inputting a signal in a predetermined variation state; an analysis section for extracting a characteristic vector from the input signal; a calculator for calculating the value of an adaptive identification function with respect to the characteristic vector with use of an identification function for identifying the characteristic vector, the identification function having an identification parameter transformed to be adaptable to the predetermined variation state; and a determination section for determining an identification result based on the calculation result of the calculator, the identification parameter being obtained by applying a fixed identification parameter independent of the predetermined variation state and a maximum-likelihood adaptation parameter to an adaptation parameter used for transforming the identification function, the maximum-likelihood adaptation parameter being an adaptation parameter that maximizes the probability of generating a signal sample in the predetermined variation state on the condition that the adaptation function is used, the fixed identification parameter being obtained by a learning method which comprises a first step of determining learning maximum-likelihood adaptation parameters that respectively maximize the probabilities of generating learning samples in a plurality of variation states of the input characteristic vector on the condition that the adaptation function is used, a second step of calculating the likelihood of the fixed identification parameter with respect to all of the variation states according to the learning maximum-likelihood adaptation parameters and the fixed identification parameter obtained through learning which has been previously performed, a third step of determining as to whether the calculated likelihood is equal to or greater than a predetermined threshold, and a fourth step of using as a learning value the fixed identification parameter whose likelihood is equal to or greater than the predetermined threshold.

According to still another aspect of the present invention, there is provided an identification unit comprising: an input section for inputting a signal in a predetermined variation state; an analysis section for extracting a characteristic vector from the input signal; a characteristic-vector adaptation section for applying the characteristic vector to an adaptation function formed of a maximum-likelihood adaptation parameter so as to adapt the characteristic vector to an identification parameter, which is a standard pattern for identification, thereby generating an adaptive characteristic vector; a calculator for calculating the value of an adaptive identification function with respect to the characteristic vector with the application of the adaptive characteristic vector to the identification function; and a determination section for determining an identification result based on the calculation result of the calculator, the identification parameter being a fixed parameter independent of the predetermined variation state, the maximum-likelihood adaptation parameter being an adaptation parameter that maximizes the probability of generating a signal sample in the predetermined variation state on the condition that the adaptation function is used, the identification parameter being obtained by a learning method which comprises a first step of determining learning maximum-likelihood adaptation parameters that respectively maximize the probabilities of generating learning samples in a plurality of variation states of the input characteristic vector on the condition that the adaptation function is used, a second step of calculating the likelihood of the fixed identification parameter with respect to all of the variation states according to the learning maximum-likelihood adaptation parameters and the identification parameter obtained through learning which has been previously performed, a third step of determining as to whether the calculated likelihood is equal to or greater than a predetermined threshold, and a fourth step of using as a learning value the identification parameter whose likelihood is equal to or greater than the predetermined threshold.

According to a further aspect of the present invention, there is provided a speech recognition system comprising: acoustic analysis means for acoustically analyzing input speech and calculating a characteristic vector of the speech; recognition means for recognizing the speech based on the characteristic vector; a calculator for calculating the value of an adaptive identification function with respect to the characteristic vector with use of an identification function for identifying the characteristic vector, the identification function having an identification parameter transformed to be adaptable to a variation state of the input speech; and a determination section for generating a speech recognition result based on the calculation result of the calculator, the identification parameter being obtained by applying a fixed identification parameter independent of the predetermined variation state and a maximum-likelihood adaptation parameter to an adaptation parameter used for transforming the identification function, the maximum-likelihood adaptation parameter being an adaptation parameter that maximizes the probability of generating a signal sample in the predetermined variation state on the condition that the adaptation function is used, the fixed identification parameter being obtained by a learning method which comprises a first step of determining learning maximum-likelihood adaptation parameters that respectively maximize the probabilities of generating learning samples in a plurality of variation states of the input characteristic vector on the condition that the adaptation function is used, second step of calculating the likelihood of the fixed identification parameter with respect to all of the variation states according to the learning maximum-likelihood adaptation parameters and the fixed identification parameter obtained through learning which has been previously performed, a third step of determining as to whether the calculated likelihood is equal to or greater than a predetermined threshold, and a fourth step of using as a learning value the fixed identification parameter whose likelihood is equal to or greater than the predetermined threshold.

According to a further aspect of the present invention, there is provided a speech recognition system comprising: acoustic analysis means for acoustically analyzing input speech and calculating a characteristic vector of the speech; a characteristic-vector adaptation section for applying the characteristic vector to an adaptation function formed of a maximum-likelihood adaptation parameter so as to adapt the characteristic vector to an identification parameter, which is a standard pattern for identification, thereby generating an adaptive characteristic vector; a calculator for calculating the value of an adaptive identification function with respect to the characteristic vector with the application of the characteristic vector to an identification function formed of the identification parameter; and a determination section for generating a speech recognition result based on the calculation result of the calculator, the identification parameter being a fixed parameter independent of the predetermined variation state, the maximum-likelihood adaptation parameter being an adaptation parameter that maximizes the probability of generating a signal sample in the predetermined variation state on the condition that the adaptation function is used, the identification parameter being obtained by a learning method which comprises a first step of determining learning maximum-likelihood adaptation parameters that respectively maximize the probabilities of generating learning samples in a plurality of variation states on the condition that the adaptation function is used, a second step of calculating the likelihood of the fixed identification parameter with respect to all of the variation states according to the learning maximum-likelihood adaptation parameters and the identification parameter obtained through learning which has been previously performed, a third step of determining as to whether the calculated likelihood is equal to or greater than a predetermined threshold, and a fourth step of using as a learning value the identification parameter whose likelihood is equal to or greater than the predetermined threshold.

BRIEF DESCRIPTION OF THE DRAWINGS

FIG. 2 is a block diagram of the configuration of an embodiment of an identification-function calculator formed by the present invention;

DESCRIPTION OF THE PREFERRED EMBODIMENTS

Figure 1:
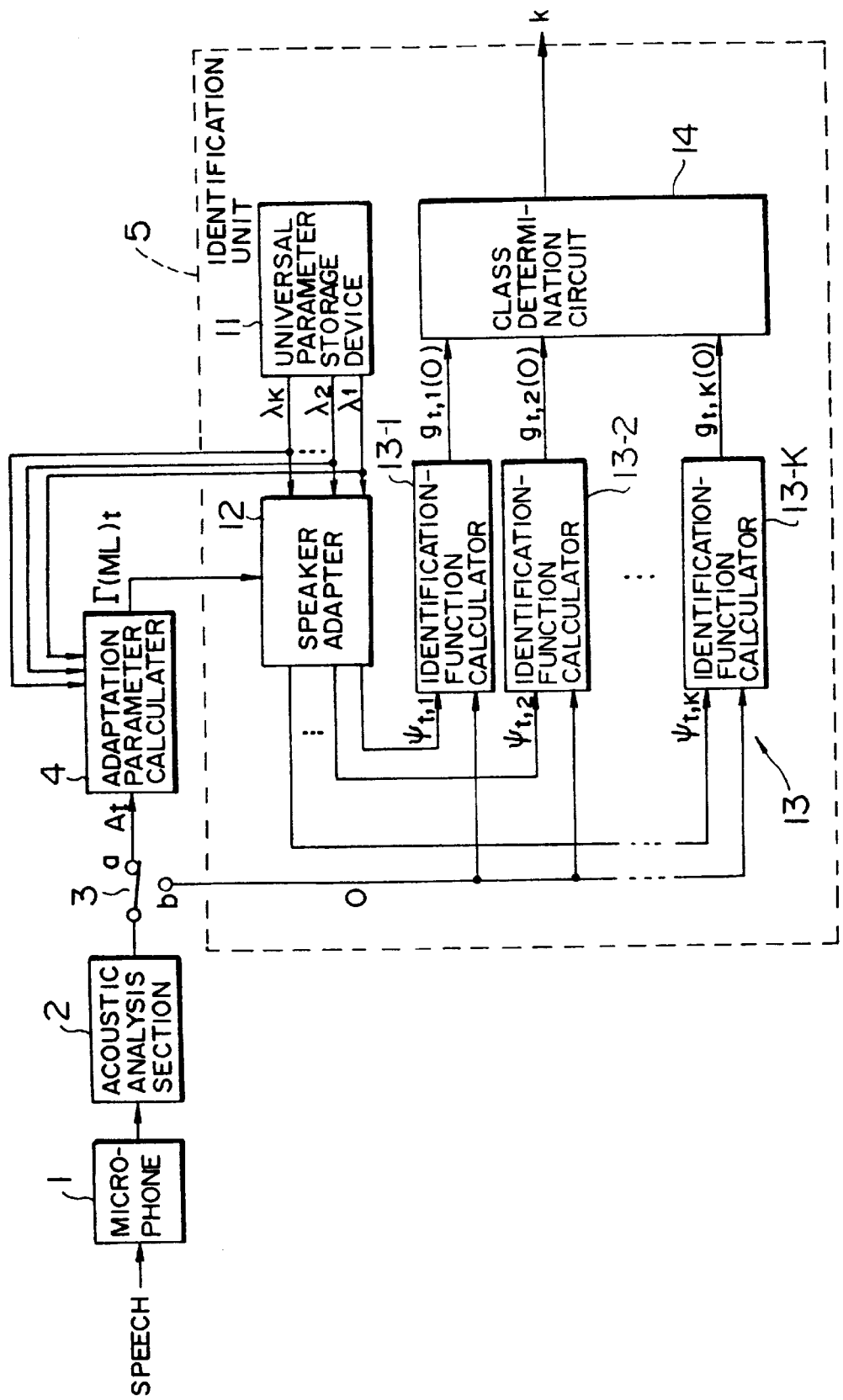
FIG. 1 is a block diagram of the configuration of an embodiment of a speech recognition system formed by the application of the present invention.

FIG. 1 is a block diagram of the configuration of an embodiment of a speech recognition system formed by the application of the present invention. In this system, speech adapted for the speaker is recognized.

More specifically, speech input into a microphone 1 is converted to a sound signal as an electric signal and is further output to an acoustic analysis section 2. In this section 2, the sound signal output from the microphone 1 is subjected to analog-to-digital conversion for conversion into a digital sound signal and further undergoes predetermined acoustic analyses, so that speech characteristic vectors (for example, the linear predictive coefficient (LPC), the LPC spectrum, the power of every predetermined bandwidth, and so on) can be extracted. The characteristic vectors O are then supplied to a switch 3. The switch 3 selects a terminal when speech adaptation to a speaker Vt is required, for example, when a speaker starts to make a sound. Accordingly, the characteristic vectors O output from the acoustic analysis section 2 are supplied to an adaptation parameter calculator 4 via the switch 3 and the terminal a as a sample At used for performing adaptation to the speaker Vt (hereinafter referred to as "the adaptation sample").

The adaptation parameter calculator 4 calculates, based on the adaptation sample At, an adaptation parameter Γ(ML)t used for adapting the universal identification function stored in a below-described identification unit 5 to the speaker Vt, and the resulting adaptation parameter Γ(ML)t is supplied to a speaker adaptor 12 forming the identification unit 5. Upon outputting of the adaptation parameter Γ(ML)t to the identification unit 5 from the adaptation parameter calculator 4, the switch 3 selects a terminal b. This causes the characteristic vectors O output from the acoustic analysis section 2 to be supplied to identification-function calculators 13 (identification-function calculators 13-1 through 13-K) of the identification unit 5 via the switch 3 and the terminal b.

In the identification unit 5, the characteristic vectors O are classified under a predetermined number K of classes Ck with use of an identification function (different from the universal or discriminant identification function only in the parameter, i.e., $\phi t,k \ne \lambda k$), so that the speech input into the microphone 1 can be identified (recognized). More specifically, the parameters $\lambda k$ (vectors) of the universal identification function corresponding to the classes Ck (for example, the parameters a, b and c of the function $f(x)= ax^2+bx+c$) (in this embodiment, referred to as "the universal discriminant function parameters or universal parameters" as required) are stored in a universal parameter storage device 11. Upon receiving the adaptation parameter Γ(ML)t from the adaptation parameter calculator 4, the speaker adaptor 12 reads the universal identification function (universal parameter) from the universal parameter storage device 11 and adapts, based on the adaptation parameter Γ(ML)t, the function (converts the function) to the speaker Vt. This makes it possible to calculate the parameter $\phi t,k(= F((\lambda k, \Gamma(ML)t))$ that forms the identification function adapted to the adaptation sample At, i.e., in this case, the speaker Vt (in this embodiment, referred to as "the adaptive identification function" as required).

The parameter $\phi t,k$ is fed to the identification-function calculator 13-K for calculating the value of the adaptive discriminant or identification function corresponding to the class Ck. In the calculator 13-k, the value of the adaptive identification function expressed by the parameter $\phi t,k$ is calculated with the use of the characteristic vectors O as an input value and is output to a class determination circuit 14. The determination circuit 14 detects, for example, the greatest value of the functions output from the identification-function calculators 13-1 through 13-K, and the suffix k of the class Ck corresponding to the greatest value of the adaptive identification function is determined and output as a speech recognition result.

The recognition (identification) principle of the speech recognition system shown in FIG. 1 will now be explained. The adaptive identification function associated with a certain class Ck adapted to the state of a variation factor (variation state) Vt is represented by g t,k(•). For example, in speech recognition performed in which a phoneme is output as a speech recognition result, Vt represents the speaker and the class Ck indicates a phoneme as a recognition result.

If the variation state Vt is known and the sample (characteristic vectors) O is observed in the variation state Vt, the class determination rule for determining under which class the sample O is classified is defined by the following equation.

$$k = \operatorname{argmax}_{k} g_{t,k}(O) \qquad (1)$$

Equation (1) determines k which maximizes the function g t,k(O). In this case, the sample O is identified as the class Ck with the suffix k determined by equation (1).

It will now be assumed that there are K classes ranging from class C1 to class CK as the classes Ck, and the priori probabilities p(C1, Vt) through p(CK, Vt) of observing the samples 0 belonging to the respective classes C1 through CK in the variation state Vt are equal. More specifically, concerning, for example, speech recognition, if the priori probabilities p(C1, Vt) through p(CK, Vt) of a speaker's Vt making a sound of the respective phonemes C1 through CK to be recognized are equal, the adaptive identification function g t,k(O) that can minimize the erroneous-recognition rate when the sample O is observed in the variation state Vt can be expressed by, for example, the following equation:

$$g\ t,k(O)=p(O|Ck, Vt) \qquad (2)$$

Namely, in this case, the adaptive identification function g t,k(O) can be represented by the probability density function p(O|Ck, Vt) conditioned by the variation state Vt and the classes Ck (hereinafter referred to as "the conditional probability density function" as required). It will now be assumed that the conditional probability density function p(O|Ck, Vt) is uniquely determined by the parameter (vectors) φt,k, in other words, the function can be represented in a parametric form. For representing that the conditional probability density function p(O|Ck, Vt) depends on the parameter φt,k, the function p(O|Ck, Vt) will hereinafter be represented by p(O|φ,t,k).

If the probability density function p(O|λk) conditioned by the classes Ck and expressed in a parametric form (hereinafter also referred to as "the conditional probability density function" as required) has been determined, the conditional probability density function p(O|φt,k) can be obtained by adapting the function p(O|λt,k) to the variation state Vt. Since the conditional probability density function p(O|λk) is applicable to all the variation states Vt, i.e., the function is independent of the variation states Vt, it can be referred to as the "universal" conditional probability density function. It will now be assumed that Gk(O) is equal to p(O|λk), and thus, Gk(O) will hereinafter be referred to as "the universal discriminant or identification function" as required. Further, since λk indicates a parameter forming (representing) the universal identification function Gk(•), it will be referred to as "the universal discriminant function parameter or universal parameter" in this embodiment as required.

As is seen from the foregoing description, the adaptive discriminant or identification function g t,k(O) can be obtained by adapting the universal identification function Gk(O) to the variation state Vt. If the function of performing transformation corresponding to the aforementioned adaptation (hereinafter referred to as "the adaptive function" as required) is expressed by F(•) and controlled by the adaptation parameter (vectors) γt,k, the parameter indicating the adaptive identification function g t,k(O) (in this embodiment, referred to as "the identification parameter" as required) can be expressed by the following equation:

$$\phi t,k=F(\lambda k, \gamma t,k) \qquad (3)$$

As required, the vectors [φt,1,φt,2, ... φt,K] formed of a group consisting of the identification parameters φt,1, φt,2, ... φt,K will be designated by Ψt; the vectors [λ1, λ2, ..., λK] constituted of a group consisting of the universal parameters λ1, λ2, ..., λK will be represented by Λ; and the vectors [γt,1, γt,2, ..., γt,K] formed of a group consisting of the adaptation parameters γt,1, γt,2, ..., γt,K will be indicated by Γt. Under these conditions, equation (3) can be expressed by the following equation:

$$\Psi t=F(\Lambda,\Gamma t) \qquad (4)$$

For performing speech recognition (identification), the adaptive identification function g t,k(O) is obtained by adapting the universal identification function Gk(O) to the variation state Vt. This requires the determination of the adaptation parameter Γt that controls (forms) the adaptive function F(Λ, Γt) and corresponds to the variation state Vt. The adaptation parameter Γt can be determined based on the sample At observed in the variation state Vt (this sample is used for adapting the universal identification function Gk(O) to the variation state Vt, and is thus referred to as "the adaptation sample" in this embodiment as required. The adaptation sample At can be expressed by the following equation:

$$A_t = \bigcup_{k=1}^{K} O_{t,k}^{(A)}, O_{t,k}^{(A)} = \bigcup_{i=1}^{m_{t,k}} O_{t,k,i}^{(A)} \qquad (5)$$

wherein Ot,k,i(A) represents the i-th characteristic vector O observed in the variation state Vt and belonging to the class Ck, and m t,k indicates the total number of the characteristic vectors O observed in the variation state Vt and belonging to the class Ck. Moreover, (A) of the characteristic vectors O t,k,i(A) indicates that the characteristic vectors O t,k,i(A) are used for adapting the universal identification function Gk(O) to the variation state Vt. It should be noted that m t,k may be only a small value, for example, one.

In the above case, the maximum likelihood Γ(ML)t of the adaptation parameter Γt can be found by the following equation:

$$\Gamma_{(ML)t} = \underset{\Gamma_t}{\mathrm{argmax}} p(A_t | F(\Lambda, \Gamma_t)) \qquad (6)$$

Namely, equation (6) determines the parameter Γt that maximizes the likelihood p(At|F(Λ,Γt)).

$$p(A_t | F(\Lambda, \Gamma_t)) = p(A_t | \psi_t) \qquad (7)$$
$$= \prod_{K=1}^{K} \prod_{i=1}^{m_{t,k}} p(O_{t,k,i}^{(A)} | \psi_{t,k})$$
$$= \prod_{k=1}^{K} \prod_{i=1}^{m_{t,k}} p(O_{t,k,i}^{(A)} | F(\lambda_k | \gamma_{t,k}))$$

It should be noted that the universal parameter Λ be fixed.

Subsequent to the determination of the adaptation parameter Γt (the maximum likelihood Γ(ML)t of the adaptation parameter) from equation (6), the identification parameter Ψt is found according to equation (4), and the conditional probability density function p(O|Ψt) with respect to the input characteristic vector O, i.e., the adaptive identification function g t,k(O), is calculated so as to determine k that satisfies the condition expressed by equation (1). In this manner, the identification result of the input characteristic vector O, i.e., the class Ck, can be obtained.

In the speech recognition system shown in FIG. 1, the suffix k of the class Ck is output as a speech recognition result, based on the above-described principle. Namely, the adaptation parameter calculator 4 determines the adaptation parameter Γt (the maximum likelihood Γ(ML)t) with the use of the adaptation sample At according to equation (6). The universal parameter Λ(λ, λ2, ..., λK) stored in the universal parameter storage device 11 is fed to the speaker adaptor 12 in which the universal parameter Λ(λ1, λ2, ..., λK) is transformed according to equation (3) or (4) with the use of the adaptation parameter Γt found in the adaptation parameter calculator 4. This makes it possible to calculate the identification parameter Ψt(φt,1, φt,2, ..., φt,K) forming the adaptive identification function g t,k(•) obtained by adapting the universal identification function Gk(•) to the adaptation sample At. In the respective identification-function calculators 13-1 through 13-K, the values g t,1(O), g t,2(O), ..., g t,K(O) of the adaptive identification function g t,k(•) represented by the identification functions φt,1, φt,2, ..., φt,K with respect to the characteristic vector O are calculated. Thereafter, in the class determination circuit 14, k satisfying equation (1) is determined with the use of the values g t,1(O), g t,2(O), ..., g t,K(O) of the function g t,k(•).

An explanation will now be given of a calculating method (learning method) for the universal identification function Gk(•), i.e., for the universal parameter Λ, stored in the universal parameter storage device 11 shown in FIG. 1. It will now be assumed that there are learning samples X belonging to the K number of classes C1, C2, ..., CK which are each formed of a group consisting of the characteristic vectors and are observed (extracted) in the T number of variation states V1, V2, ..., VT. These samples X can be expressed by the following equations:

$$X = \bigcup_{t=1}^{T} X_t \tag{8}$$

$$X_t = \bigcup_{k=1}^{K} O_{t,k} \tag{9}$$

$$O_{t,k} = \bigcup_{i=1}^{m_{t,k}} O_{t,k,i} \tag{10}$$

In equation (8), Xt depicts a group of learning samples observed in the variation state Vt; in equation (9), Ot,k indicates the group of learning samples belonging to the class Ck among the learning samples observed in the variation state Vt; and in equation (10), m t,k designates the characteristic vectors forming the learning samples (a group of learning samples) O t,k, i.e., the total number of the learning samples belonging to the class Ck observed in the variation state Vt, and O t,k,i represents the i-th characteristic vector of the learning sample O t,k.

The vectors formed of a group consisting of the adaptation parameters Γ1, Γ2, ..., ΓK and the vectors constituted of a group consisting of identification parameters Ψ1, Ψ2, ..., ΨK are represented by Γ and Ψ, as expressed by the following equations (11) and (12), respectively.

Γ=[Γ1,Γ1, Γ2, ..., ΓT]         (11)

Ψ=[Ψ1, Ψ2, ..., ΨT]         (12)

In the above case, equation (3) or (4) can be expressed by the following equation:

Ψ=F(Λ,Γ)         (13)

In this embodiment, learning is conducted on the universal parameter Λ based on the likelihood of the adaptive identification function g t,k(•) with respect to the learning samples X, the function g t,k(•) being obtained by performing transformation (transformation with the adaptation function F) F(•) to adapt the universal identification function G K(•) to the learning samples X (the function g t,k(•) is formed of a parameter Ψt, i.e., F(Λ,Γt) as discussed above). This likelihood will hereinafter be expressed as p(X|F(Λ, Γt)).

The adaptation parameter Γt, which is used for adapting the universal parameter Λ to the variation state Vt, i.e., to the adaptation sample At, can be obtained based on the relationship between the universal parameter Λ and the learning sample Xt. Further, since the adaptation sample At is voluntarily observed in the variation state Vt, the adaptation parameter Γt can be considered as a probability variable for the variation state Vt. In this case, the logarithmic likelihood U1(X,Λ) of the universal parameter Λ with respect to the learning samples X can be defined by the following equation:

$$U_1(X, \Lambda) = \sum_{t=1}^{T} \int \log(p(X_t | F(\Lambda, \Gamma_t))) p(\Gamma_t | \Lambda) d\Gamma_t \tag{14}$$

Equation (14) indicates the logarithmic likelihood of the universal parameter Λ for T number of variation states Vt.

The maximum likelihood Λ(ML) of the universal parameter Λ can be determined by maximizing the logarithmic likelihood U1(X,Λ), as expressed by the following equation:

$$\Lambda_{(ML)} = \mathrm{argmax}_{\Lambda} U_1(X, \Lambda) \tag{15}$$

$$= \mathrm{argmax}_{\Lambda} \sum_{t=1}^{T} \int \log(p(X_t | F(\Lambda, \Gamma_t))) p(\Gamma_t | \Lambda) d\Gamma_t$$

It should be noted that the determination of the universal parameter Λ that maximizes the logarithmic likelihood U1(X,Λ) is the same as the determination of the universal parameter Λ that maximizes the aforementioned likelihood p(x|F(Λ,Γt). However, infinite samples are, in general, required for obtaining the likelihood p(Γt|Λ) in equation (15). Thus, the likelihood p(Γt|Λ) is learned inductively so as to be maximized.

More specifically, a sample B t,h (which will hereinafter be referred to as "the adaptation samples" as required) used for determining the adaptation parameter Γ is selected from learning samples Xt (which are not essential and may be samples observed in the variation states Vt). It should be noted that h=1, 2, ..., Ht which indicates the total number of the selected learning samples. Ht may be equal to or greater than one. In this case, the logarithmic likelihood U2(X,Λ) of the universal parameter Λ with respect to the learning samples X can be expressed by the following equation:

$$U_2(X, \Lambda) = \sum_{t=1}^{T} \sum_{h=1}^{H} \log p(X_t | F(\Lambda, \Gamma_{(ML)t,h})) \tag{16}$$

wherein Γ(ML)t,h depicts the maximum likelihood of the adaptation parameter obtained based on the sample B t,h and can be found by the following equation:

$$\Gamma_{(ML)t,h} = \mathrm{argmax}_{\Gamma} p(B_{t,h} | F(\Lambda, \Gamma)) \tag{17}$$

The maximum likelihood Λ(ML) of the universal parameter Λ can be obtained by maximizing equation (16) according to the following equation:

$$\Lambda_{(ML)} = \mathrm{argmax}_{\Lambda} U_2(X, \Lambda) \tag{18}$$

FIG. 2 is a schematic diagram of the configuration of an embodiment of an identification-function calculator for calculating the universal identification function Gk(•), i.e., the universal parameter Λ, based on the aforedescribed principle. Learning samples X are supplied to an extractor 21 which extracts a learning sample used for calculating adaptation function-parameter and also to a universal parameter calculator 23. For calculating the universal parameter Λ applied to the identification unit 5 shown in FIG. 1 (the parameter Λ stored in the universal parameter storage device 11), characteristic vectors output from the acoustic analysis section 2 are used as the learning samples X.

The above-described sample B t,h is extracted from the learning-sample extractor 21 by selecting the sample B t,h from the learning samples X based on, for example, random numbers generated in the extractor 21. The sample B t,h extracted in the extractor 21 are fed to an adaptation parameter calculator 22. A predetermined universal parameter (the initial parameter or the previous parameter) is also supplied to the adaptation parameter calculator 22. In the adaptation parameter calculator 22, the adaptation parameter Γ for adapting the universal parameter Λ fed from the universal parameter calculator 23 to the sample B t,h is calculated. That is, the adaptation parameter calculator 22 calculates the maximum likelihood Γ(ML)t,h of the adaptation parameter Γ according to equation (17) and then outputs it to the universal parameter calculator 23.

In the universal parameter calculator 23, the maximum likelihood Λ(ML) of the universal parameter Λ is determined according to equation (18). More specifically, in the universal parameter calculator 23, the universal parameter Λ is transformed, based on the adaptation parameter Γ(ML)t,h supplied from the adaptation parameter calculator 22, so that F(Λ,Γ(ML)t,h) in equation (16) (which represents the parameter Ψt of the adaptive identification function g t,k(•) obtained by transforming the universal identification function Gk(•) to be adaptable to the sample B t,h) can be attained. Also, the universal parameter Λ(ML) (the logarithmic likelihood U2 expressed by equation (16) in this embodiment) that maximizes the likelihood of F(Λ,Γ(ML) t,h) with respect to the samples X is calculated.

Further, the universal parameter calculator 23 determines whether the logarithmic likelihood U2 for providing the universal parameter Λ(ML) is equal to or greater than, for example, a predetermined threshold. If the logarithmic likelihood U2 is found to be smaller than the predetermined threshold, the universal parameter calculator 23 supplies to the adaptation parameter calculator 22 the universal parameter Λ which is likely to improve the logarithmic likelihood U2. Upon receiving the updated universal parameter Λ, the adaptation parameter calculator 22 re-calculates the maximum likelihood Γ(ML)t,h of the adaptation parameter Γ according to equation (17) and outputs the maximum likelihood Γ(ML)t,h to the universal parameter calculator 23.

The above-described processing is repeated in the adaptation parameter calculator 22 and the universal parameter calculator 23 until the logarithmic likelihood U2 for supplying the universal parameter Λ(ML) reaches the predetermined threshold. When the predetermined threshold is reached, the universal parameter calculator 23 outputs the universal parameter Λ(ML) to a memory 24 and stores it therein. The universal parameter Λ(ML) is then transferred to, for example, the universal parameter storage device 11 shown in FIG. 1 as required.

In this manner, learning is carried out while the universal identification function Gk(•) is adapted to the learning sample Xt in accordance with the relationship between the variation state Vt and the universal identification function Gk(•). It is thus possible to gain the universal identification function Gk(•) that can offer the highest performance when adaptation is made. By use of this universal identification function Gk(•) during recognition, the recognition accuracy can be improved.

If p(Γt|Λ) in equation (14) is designated by comparatively a small number of parameters, and if comparatively a large number of samples are provided as the samples B t,h, the variation in the mean values of the samples is decreased, thereby further decreasing a distribution in the adaptation parameters Γt. It will now be assumed that the distribution of the adaptation parameters Γt is zero. The logarithmic likelihood U3(X,ΛΛ) of the universal parameter Λ with respect to the learning samples X can thus be expressed by the following equation, since ∫p(Γt|Λ)d Γt is equal to one:

$$U_3(X, \Lambda) = \sum_{t=1}^{T} \log p(X_t \mid F(\Lambda, \Gamma_{(ML)t})) \qquad (19)$$

wherein Γ(ML)t designates the maximum likelihood of the adaptation parameter Γt obtained by the following equation:

$$\Gamma_{(ML)t} = \underset{\Gamma}{\operatorname{argmax}} p(X_t \mid F(\Lambda, \Gamma)) \qquad (20)$$

In the above case, the objective function U4(X,Λ,Γ) to be maximized can be expressed by the following equation according to equations (19) and (20).

$$U_4(X, \Lambda, \Gamma) = \sum_{t=1}^{T} \log p(X_t \mid F(\Lambda, \Gamma_t)) \qquad (21)$$

From equation (21), the maximum likelihood Λ(ML) of the universal parameter Λ can be attained by maximizing the objective function U4(X,Λ,Γ) including both of Λ and Γ. Λ and Γ that maximize U4(X,Λ,Γ) can be obtained according to, for example, the simulated annealing method, the steepest descent method, and the expectation maximization (EM) algorithm. The simulated annealing method achieves relatively good solutions, though it requires greater computations. On the other hand, the steepest descent method and the EM algorithm require only small computations, while, disadvantageously, frequently resulting in the localized maximum values as the solutions.

An explanation will now be given of the aforedescribed learning method in which the universal identification function Gk(•) uses, for example, a normal distribution (mixed normal distribution) function by setting covariance components other than diagonal components to be zero so as to be expressed in a parametric form, and the adaptation parameters employ, for example, add vectors. In the above case, the universal identification function Gk(O) indicating the J-th p Gaussian distribution can be expressed by the following equation:

$$G_k(O) = p(O \mid \lambda_k) \qquad (22)$$

$$= \frac{1}{(2\pi)^{\frac{J}{2}} \prod_{j=1}^{J} \sigma_{k,j}} \exp\left\{-\sum_{j=1}^{J} \frac{(o_j - \mu_{k,j})^2}{2\sigma_{k,j}^2}\right\}$$

wherein J represents the number of components (the number of dimensions) of the characteristic vector O; oj indicates the j-th component of the characteristic vector O; and μk,j and σk,j2 respectively designate the mean value and the distribution of the j-th component oj. In this case, the universal parameter λk can be represented by [μk,1, μk,2, ..., μk,J, σk,12, σk,22, ..., σk,J2].

If the adaptation parameter of the adaptation function F(•), i.e., the add vector Γt in this case, is expressed by [γt,k,1, γt,k,2, ..., γt,k,J], and if μk,j and σk,j2 adapted to the learning samples Xt are indicated by μ t,k,j and σ t,k,j2, respectively, the adaptation parameter φt,k can be expressed by the following equation:

$$\phi t,k=F(\lambda k,\Gamma t)=[\mu t,k,1,\mu t,k,2,\ldots,\mu t,k,J,\sigma t,k,12,\sigma t,k,22,\ldots, \sigma t,k,J2]=[\mu k,1+\gamma t,k,1,\mu k,2+\gamma t,k,2,\ldots,\mu k,J+\gamma t,k,J,\sigma k,12, \sigma k,22,\ldots,\sigma k,J2] \quad (23)$$

In this case, therefore, the adaptive identification function g t,k(O) can be expressed by the following equation:

$$g_{t,k}(O) = p(O \mid \psi_{t,k}) \quad (24)$$

$$= \frac{1}{(2\pi)^{\frac{J}{2}} \prod_{j=1}^{J} \sigma_{t,k,j}} \exp\left\{-\sum_{j=1}^{J} \frac{(o_j - \mu_{t,k,j})^2}{2\sigma_{t,k,j}^2}\right\}$$

The universal identification function G k(•), i.e., the universal parameter Λ, can be attained by maximizing the logarithmic likelihood L(Λ,Γ) expressed by the following equation with respect to both of Λ and Γ(ML)t,h according to equations (16) through (18).

$$L(X, \Lambda) = \sum_{t=1}^{T} \sum_{h=1}^{H_t} \log p(B_t \mid F(\Lambda, \Gamma_{(ML)t,h})) \quad (25)$$

$$= \sum_{t=1}^{T} \sum_{h=1}^{H_t} \log \frac{1}{(2\pi)^{\frac{J}{2}} \prod_{j=1}^{J} \sigma_{t,k,j}} \exp\left\{-\sum_{j=1}^{J} \frac{(O_j - \mu_{t,k,j} - \Gamma_{(ML)t,h})^2}{2\sigma_{t,k,j}^2}\right\}$$

wherein Γ(ML)t,h designates the maximum likelihood of the add vector Γt obtained with use of learning sample Bt,h∈Xt, which can be expressed by the following equation:

$$\Gamma_{(ML)t,h} = \underset{\Gamma_{t,h}}{\mathrm{argmax}} p(B_{t,h} \mid F(\Lambda, \Gamma_{t,h})) \quad (26)$$

wherein F(Λ,Γt,h) can be found by the following equation:

$$F(\Lambda,\Gamma t,h)=[\mu k,1+\gamma t,k,1,h,\mu k,2+\gamma t,k,2,h,\ldots,\mu k,J,+\gamma t,k,J,h,\sigma k,12, \sigma k,22,\ldots,\sigma k,J2] \quad (27)$$

wherein γ t,k,j,h represents γ t,k,j with respect to the sample B t,h.

Figure 3A:
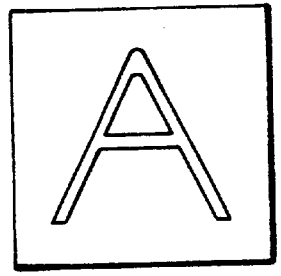
FIGS. 3A to 3D illustrate the principle of the present invention.

The principle of the learning method discussed above can be considered in the following intuitive manner. An example of this principle will be given of the case where learning is performed in, for example, image recognition (character recognition) on the standard pattern of the character "A" corresponding to the universal identification function Gk(•). If, for example, only the patterns of the character "A" of substantially the same shape free from slanting are input to be recognized during recognition, it is merely essential that such patterns are learned in a manner similar to the known technique. Hence, the standard pattern reflecting the characteristics of the input character "A", as shown in FIG. 3A, can be obtained.

Figure 3B:

In practice, however, it is very unlikely that only the above-described patterns of character "A" of substantially the same shape free from slanting are always input during recognition. Instead, in general, the types of character "A" slanting in the right or left direction illustrated in FIG. 3B, as well as the character "A" free from slanting, are input. Hitherto, learning is unfavorably conducted in such a manner that both of the character "A" free from slanting and the character "A" slanting in the right or left direction are included, as they are, in the standard pattern. Hence, the resulting standard pattern of the character "A" is disadvantageously indicated, in the extreme case, as shown in FIG. 3D, with significant impairment of the characteristics of the character "A".

Figure 3C:
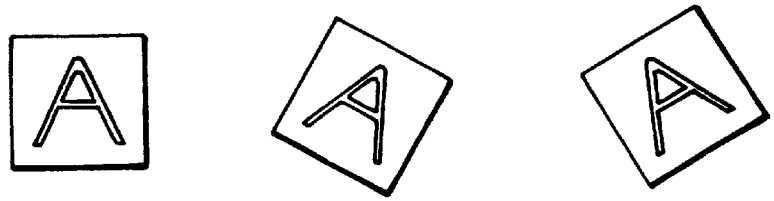
Figure 3D:
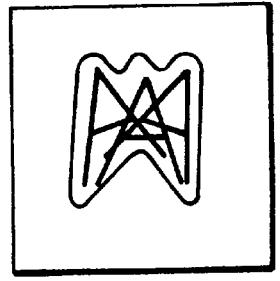
Figure 4:
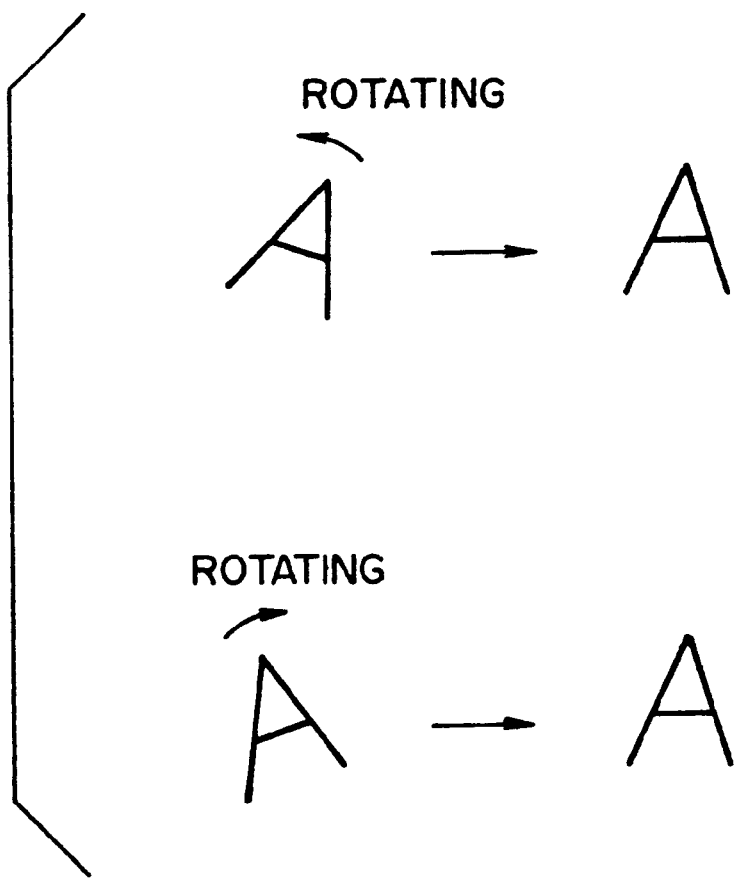
FIG. 4 illustrates the principle of the present invention.

In order to overcome the above drawback, in the present invention, the standard pattern of the character "A" is rotated, as illustrated in FIG. 3C, in accordance with the slanting of the character "A" as learning samples. In other words, learning is conducted in such a manner that the standard pattern corresponding to the universal parameter Λ is transformed with the adaptation function F(•) to be adaptable to the learning samples, so that the standard pattern sufficiently reflecting the characteristics of the character "A" can be achieved. During recognition, the resulting standard pattern can be adapted to the input characters to be recognized so as to enhance the recognition performance.

The adaptation between the standard pattern and the learning samples performed during learning may be done in the following manner. As described above, the standard pattern of the character "A" may be rotated to match the slanting of the learning samples, as shown in FIG. 3C. Alternatively, the learning samples may be adapted to the standard pattern by rotating the character "A" as the learning samples according to the slanting of the character. The same applies to the adaptation performed during recognition.

Figure 5:
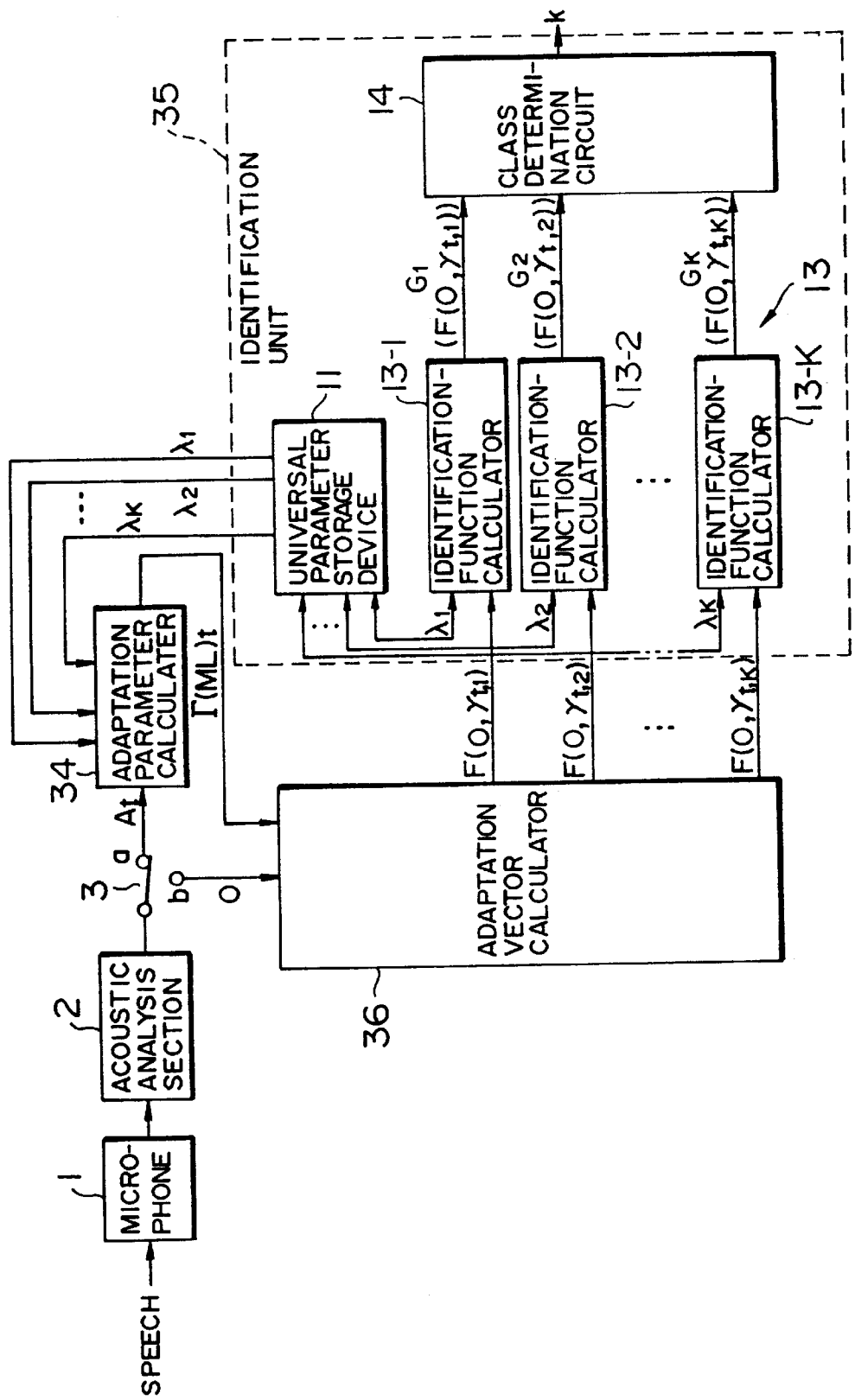
FIG. 5 is a block diagram of the configuration of another embodiment of a speech recognition system formed by the application of the present invention.

FIG. 5 is a schematic diagram of the configuration of another embodiment of a speech recognition system for performing speech recognition based on the adaptation method in which the learning samples are adapted to the standard pattern. The elements corresponding to those shown in FIG. 1 are designated by like reference numerals, and an explanation thereof will thus be omitted as required. In this speech recognition system, as well as the system illustrated in FIG. 1, the recognition of speech adapted to the speaker is conducted.

As has been previously discussed, the switch 3 selects the terminal a when the adaptation to the speaker Vt is required. This causes the characteristic vectors O to output from the acoustic analysis section 2 to an adaptation parameter calculator 34 via the switch 3 and the terminal a as the adaptation sample At used for the adaptation to the speaker Vt. The adaptation parameter calculator 34 calculates, based on the adaptation sample At, the adaptation parameter Γ(ML)t used for adapting the characteristic vectors O to the universal identification function stored in the below-described identification unit 35. The resulting adaptation parameter Γ(ML)t is output to an adaptive feature vector or adaptive vector calculator 36.

At this time, the switch selects the terminal b so that the characteristic vectors O output from the acoustic analysis section 2 are supplied to the adaptive vector calculator 36 via the switch 3 and the terminal b.

Upon receiving the adaptation parameter Γ(ML)t from the adaptation parameter calculator 34, the adaptive vector calculator 36 adapts (transforms) the characteristic vectors O based on the adaptation parameter Γ(ML)t. This makes it possible to calculate the characteristic parameter F(O|γ t,k) adapted to the universal identification function stored in the universal parameter storage device 11 (referred to as "adaptive characteristic parameter" in this embodiment as required). The adaptive characteristic parameters F(O|γt,1) through F(O|γ t,K) are supplied to the identification- function calculators 13-1 through 13-K, respectively.

In the identification unit 35, the input adaptive characteristic vectors are classified under a predetermined number K of classes Ck with use of the universal identification function, so that the identification (recognition) of speech input into the microphone 1 can be performed. More specifically, the universal parameter λk is read from the universal parameter storage device 11 and is fed to the identification-function calculator 13-k. In the calculator 13-k, the value of the universal identification function expressed by the universal parameter λk is calculated using the adaptive characteristic vector F(O|γ t,k) as the input value, and is then output to the class determination circuit 14. In the circuit 14, the speech recognition result is determined and output in a manner similar to the procedure described above while referring to FIG. 1.

The recognition (identification) principle of the speech recognition system shown in FIG. 5 will now be explained. In this system, fundamentally, the input characteristic vectors O are adapted to the universal identification function Gk(•), as described above. Thus, this system shown in FIG. 5 merely differs from the system illustrated in FIG. 1 in that the transformation with the adaptation function F(•) is performed on the characteristic vectors O instead of the universal identification function Gk(•) (universal parameter Λ), and in that the identification function used for identification uses the universal identification function G k(•) instead of the adaptive identification function g t,k (•).

Accordingly, the class-determination rule can be obtained simply by substituting the adaptive identification function g t,k(•) shown in equation (1) with the universal identification function G k(•) and by substituting the characteristic vector O in equation (1) with the adaptive characteristic vector F(O|γ t,k) adapted to the universal identification function Gk(•). Namely, the class-determination rule can be specified by the following equation:

$$k = \underset{k}{\mathrm{argmax}} G_k(F(O, \gamma_{t,h})) \tag{28}$$

Further, the maximum likelihood Γ(ML)t of the adaptation parameter Γt can be expressed by the following equation (29) modified by substituting the adaptation sample At shown in equation (6) with F(At,Γt). The likelihood p(F(At, Γt|Λ) can be expressed by the following equation (30) modified by substituting At, F(Λ,Γt), O t,k,i(A), and F(λkγ t,k) shown in equation (7) with F(Λ,Γt), Λ, F(O t,k,i(A), γt,k), and λk, respectively.

$$\Gamma_{(ML)t} = \underset{\Gamma_t}{\mathrm{argmax}} p(F(A_t, \Gamma_t) | \Lambda) \tag{29}$$

-continued
$$p(F(A_t, \Gamma_t) | \Lambda) = p(A_t | \psi_t) \tag{30}$$

$$= \prod_{k=1}^{K} \prod_{i=1}^{m_{t,k}} p(F(O_{t,k,i}^{(A)}, \gamma_{t,k}) | \lambda_k)$$

After the adaptation parameter Γt (the maximum likelihood Γ(ML)t of the adaptation parameter Γt) has been obtained according to equation (29), the adaptive characteristic vector F(O γ t,k) at the right side in equation (28) are calculated so as to determine the suffix k satisfying the condition shown in equation (28). As a consequence, the class Ck indicating the identification result of the input characteristic vectors O can be determined.

In this manner, in the speech recognition system illustrated in FIG. 5, the suffix k of the class Ck is output, based on the foregoing principle, as a speech recognition result. More specifically, the adaptation parameter calculator 34 calculates the adaptation parameter Γt (the maximum likelihood Γ(ML)t ) with use of the adaptation samples At according to equation (29). In the adaptive vector calculator 36, the characteristic vectors O are transformed with use of the adaptation parameters Γt determined in the adaptation parameter calculator 34 according to the function F(O,Γt), so that the adaptive characteristic vectors F(O, γ t,1), F(O, γt,2), . . . , F(O, γ t,K) to be obtained by adapting the characteristic vectors O to the universal identification function Gk(•) can be calculated. Then, the identification-function calculators 13-1 through 13-K respectively calculate the function values G1(F(O, γ t,1)), G2(F(O, γ t,2)), . . . , GK(F(O, γ t,K)) of the adaptive identification function Gk(•) expressed by the universal parameters λ1, λ2, . . . , λK with respect to the adaptive characteristic vectors F(O, γ t,1), F(O, γ t,2), . . . , F(O, γ t,K). Thereafter, in the class determination circuit 14, the suffix k satisfying the condition of equation (28) is determined with use of the function values G1(F(O, γ t,1)), G2(F(O, γ t,2)), GK(F(O, γ t,K)).

A description will now be given of a calculating method (learning method) for the universal identification function Gk(•), i.e., the universal parameter Λ, used in the speech recognition system shown in FIG. 5. Fundamentally, in this system, learning is carried out in such a manner that the learning samples X are adapted to the universal identification function Gk(•), as has been discussed above. Thus, the calculating method for this system merely differs from the method employed for the system illustrated in FIG. 1 in that the transformation with use of the adaptation function F(•) is performed on the learning samples X instead of the universal identification function Gk(•) (universal parameter Λ). In this embodiment, the samples obtained by adapting the learning samples X to the universal identification function Gk(•), i.e., the samples obtained by transforming the learning samples X according to the adaptation function F(•), will be referred to as "the adaptive learning samples" as required.

Accordingly, the learning samples X (or adaptation samples B t,h) are substituted for the universal parameter A to be transformed with the adaptation function F(•) in equations (14) through (18), thus resulting in equations (31) through (35). The maximum likelihood Λ(ML) of the universal parameter Λ can be determined by maximizing equation (33) according to equation (35).

$$U_1(X, \Lambda) = \sum_{t=1}^{T} \int \log(p(F(X_t, \Gamma_t) | \Lambda)) p(\Gamma_t | \Lambda) d\Gamma_t \tag{31}$$

-continued $$\Lambda_{(ML)} = \underset{\Lambda}{\mathrm{argmax}}\, U_1(X, \Lambda) \quad (32)$$

$$= \underset{\Lambda}{\mathrm{argmax}} \sum_{t=1}^{T} \int \log(p(F(X_t, \Gamma_t)\mid\Lambda))p(\Gamma_t\mid\Lambda)d\Gamma_t$$

$$U_2(X, \Lambda) = \sum_{t=1}^{T}\sum_{h=1}^{H_t} \log p(F(X_t, \Gamma_{(ML)t,h})\mid\Lambda) \quad (33)$$

$$\Gamma_{(M,L)t,h} = \underset{\Gamma}{\mathrm{argmax}}\, p(F(B_{t,h}, \Gamma)\mid\Lambda) \quad (34)$$

$$\Lambda_{(ML)} = \underset{\Gamma}{\mathrm{argmax}}\, U_2(X, \Lambda) \quad (35)$$

Figure 6:
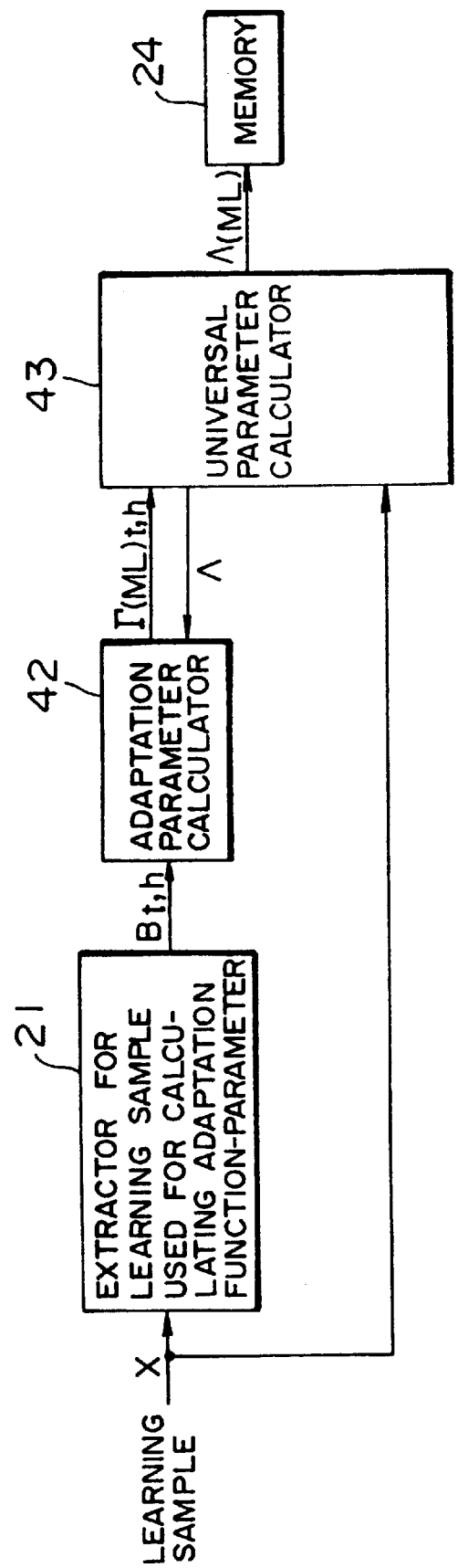
FIG. 6 is a block diagram of the configuration of another embodiment of an identification-function calculator formed by the present invention.
Figure 7:
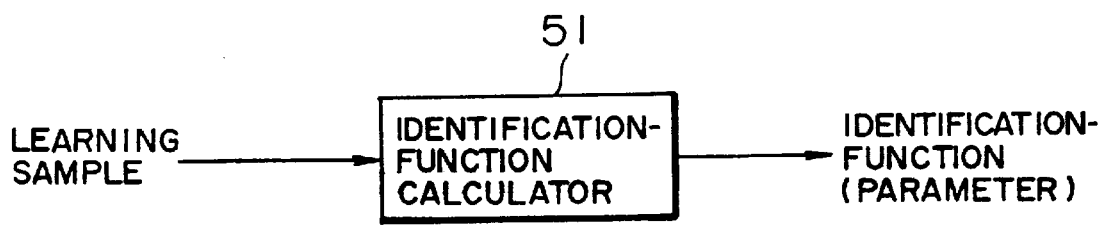
FIG. 7 is a block diagram of the configuration of an example of conventional identification-function calculators.

FIG. 6 is a schematic diagram of the configuration of another embodiment of the identification-function calculator for calculating the universal identification function Gk(•), i.e., the universal parameter Λ, based on the foregoing principle. The elements corresponding to those shown in FIG. 2 are designated by like reference numerals, and an explanation thereof will thus be omitted as required.

Supplied to an adaptation parameter calculator 42 are the sample B t,h extracted in the learning-sample extractor 21 and the universal parameter Λ output from a universal-parameter calculator 43. The adaptation parameter calculator 42 calculates the adaptation parameter Γ used for adapting the sample B t,h supplied from the extractor 21 to the universal parameter Λ fed from the universal parameter calculator 43. That is, the maximum likelihood estimate Γ(ML)t of the adaptation parameter Γt is calculated by the adaptation parameter calculator 42 according to equation (34) and is then output to the universal parameter calculator 43.

In the universal parameter calculator 43, the maximum likelihood Λ(ML) of the universal parameter Λ is determined according to equation (35). More specifically, in the universal parameter calculator 43, the learning samples X are transformed based on the adaptation parameter Γ(ML)t,h fed from the adaptation parameter calculator 42. This makes it possible to determine the adaptive learning sample F(Xt, Γ(ML)t,h) in equation (33) and also to calculate the universal parameter Λ(ML) that maximizes the likelihood (logarithmic likelihood) U2 with respect to the adaptive learning sample F(Xt,Γ(ML)t,h).

Further, the universal parameter calculator 43 determines whether the logarithmic likelihood U2 for providing the universal parameter Λ(ML) is equal to or greater than, for example, a predetermined threshold. If the logarithmic likelihood U2 is smaller than the predetermined threshold, the universal parameter calculator 43 supplies to the adaptation parameter calculator 42 the universal parameter Λ that is likely to improve the logarithmic likelihood U2. Upon receiving the updated universal parameter Λ, the adaptation parameter calculator 42 re-calculates the maximum likelihood estimate Γ(ML)t,h of the adaptation parameter Γ according to equation (34) and outputs it to the universal parameter calculator 43.

The processing similar to the above-described procedure is repeated in the adaptation parameter calculator 42 and the universal parameter calculator 43 until the logarithmic likelihood U2 for providing the universal parameter Γ(ML) reaches the predetermined threshold. When the predetermined threshold is reached, the universal parameter calculator 43 outputs the universal parameter Γ(ML) to the memory 24 and stores it therein.

In this fashion, learning is carried out while the learning samples Xt are adapted to the universal identification function Gk(•) in accordance with the relationship between the variation state Vt and the universal identification function Gk(•). It is thus possible to gain the universal identification function Gk(•) that can offer the highest performance when adaptation is made. By use of this universal identification function Gk(•) during recognition, the recognition accuracy can be improved.

If p(Γt|Λ) in equation (31) is designated by comparatively a small number of parameters, and if comparatively a large number of samples are provided as the samples B t,h, a variation in the adaptation parameters Γt becomes very small. Assuming that the distribution of the adaptation parameters Γt is zero, the following equations (36) through (38) corresponding to equations (19) through (21) are obtained.

$$U_3(X, \Lambda) = \sum_{t=1}^{T} \log p(F(X_t, \Gamma_{(ML)t})\mid\Lambda) \quad (36)$$

$$\Gamma_{(ML)t} = \underset{\Gamma}{\mathrm{argmax}}\, p(F(X_t, \Gamma)\mid\Lambda) \quad (37)$$

$$U_4(X, \Lambda, \Gamma) = \sum_{t=1}^{T} \log p(F(X_t, \Gamma_t)\mid\Lambda) \quad (38)$$

In the above case, the maximum likelihood estimate Λ(ML) of the universal parameter Λ can be attained by maximizing U4(X,Λ,Γ) in equation (38) with respect to both of Λ and Γ.

Although an explanation has been given of the present invention applied to speech recognition, this is not exclusive. The invention is applicable to any type of pattern recognition, such as image recognition.

Also, although in this embodiment the normal-distribution identification function is specifically used as the universal identification function, other types of identification functions, such as the Mahalanobis identification functions, the identification functions by Hidden Markov Models (HMM), the polynomial discriminant or identification functions, and the identification functions expressed by neural networks, may be employed.

Moreover, in this embodiment, the add vector is calculated as the adaptation parameter and is used to perform transformation to adapt the universal identification function. However, other types of adaptation parameters, for example, parameters for linear transformation, may be calculated and used to linearly transform the universal identification function. Further, the universal identification function may be adapted by, for example, linear transformation, polynomial transformation, and transformation by neural networks. The same methods are applicable to the transformation of the learning samples to the universal identification function.

Further, in the embodiment in which the universal identification function is adapted to the learning samples, the maximum likelihood of the universal parameter is determined. In other words, based on the likelihood (logarithmic likelihood) of the adaptive identification function with respect to the learning samples, the universal parameter that maximizes the likelihood is determined. However, other types of learning criteria such as the mutual information, the classification error rate, and so on, may be used, and based on the references, the universal parameter that maximizes the mutual information and the universal parameter that minimizes the classification error rate may be determined. The same is applicable to the adaptation of the learning samples to the universal identification function; the learning criteria other than the likelihood, such as the mutual information and the classification error rate, may be employed.

In this embodiment, for adapting the universal identification function to the learning samples, the maximum likelihood of the adaptation parameter is determined. In other words, based on the likelihood (logarithmic likelihood) of the adaptive identification function with respect to the learning samples, the adaptation parameter that maximizes the likelihood is determined. Other types of learning criteria, such as the mutual information and the classification error rate, may be used for the adaptation parameter, as well as the universal parameter. The same is applicable to the adaptation of the learning samples to the universal identification function.

Additionally, although in this embodiment a single universal identification function is allocated to each class, a plurality of universal identification functions may be assigned to each class.

As will be clearly understood from the foregoing description, the present invention offers the following advantages.

According to one form of the identification-function calculator and calculating method of the present invention, the identification function is learned while it is being adapted to learning samples. It is thus possible to obtain the identification function that can offer highest performance in the case that adaptation is carried out at the recognition classification stage.

According to one form of the identification unit and method of the present invention, a characteristic vector is identified with use of an adaptive identification function obtained by adapting an identification function to a characteristic vector. In this case, the identification function has been learned while it has been adapted to learning samples, and accordingly, it can offer the highest performance in the case adaptation is carried out thereof, thereby improving the identification (recognition) accuracy of the characteristic vectors, in other words, reducing the classification error rate.

According to one form of the speech recognition system of the present invention, an identification function is adapted to a characteristic vector so as to obtain an adaptive identification function. By use of this function, the characteristic vector is classified under one of a predetermined number of classes. In this case, the identification function was acquired while it was being adapted to learning samples, and accordingly, it can offer the highest performance in the case that adaptation is carried out thereof, thereby enhancing speech recognition accuracy.

According to another form of the identification-function calculator and calculating method, an identification function is learned while learning samples are being adapted to the function. This makes it possible to attain the identification function that can offer the highest identification performance in the case that adaptation is carried out at the recognition stage.

According to another form of the identification unit and method, an adaptive characteristic vector obtained by adapting a characteristic vector to an identification function is identified with use of the identification function. In this case, the identification function was learned while learning samples were been adapted to the function, and accordingly, it can offer the highest performance in the case that adaptation is made of the characteristic vector, thereby improving the identification (recognition) accuracy of the characteristic vectors.

According to another form of the speech recognition system, an adaptive characteristic vector obtained by adapting a characteristic vector to an identification function is classified under one of a predetermined number of classes. In this case, the identification function was learned while learning samples were been adapted to the function, and accordingly, it can offer the highest performance when adaptation is made of the characteristic vector, thereby enhancing speech recognition accuracy.

What is claimed is:

1. A speech recognition system comprising:

acoustic analysis means for acoustically analyzing input speech and calculating feature vectors;

a calculating section for calculating, based on the feature vectors, output values of adaptive discriminant functions in relation to the feature vectors by using the adaptive discriminant functions having adaptive discriminant function parameters that are transformed to be adapted to the state of the variation of the factors that affect the input speech;

a determining section for determining a speech recognition result based on a calculation result of said calculating section, wherein the adaptive discriminant function parameters are obtained by applying to adaptation functions, universal discriminant function parameters, which are independent of a state of the variation of the factors, and adaptation parameters for the recognition, and wherein the adaptation parameters for the recognition maximizes a probabilistic likelihood of the adaptive discriminate function parameters in relation to adaptation learning speech signal samples for the recognition under the state of the variation of the factors, the universal discriminant function parameters being obtained by a learning method which comprises:

determining, under the condition of using the adaptation functions, adaptation parameters for learning the probabilistic likelihood in relation to learning samples under the state of the variation of a plurality of factors without changing determined universal discriminant function parameters;

determining, based on the probabilistic likelihood, universal discriminant function parameters in relation to the learning without changing the determined adaptation parameters for learning;

judging, in a process of alternately performing said determining operations repeatedly, whether said learning method is to be discontinued; and using the obtained universal discriminant function parameters as trained values in a case where said learning method is discontinued after performing said judging operations.

2. The speech recognition system according to claim 1, wherein the adaptation parameters for recognition, the adaptation parameters for learning, and the universal discriminant function parameters are determined based on mutual information.

3. The speech recognition system according to claim 1, wherein the adaptation parameters for recognition, the adaptation parameters for learning, and the universal discriminant function parameters are determined based on an error rate among the learning samples.

4. The speech recognition system according to claim 1, wherein the universal discriminant function parameters are obtained by a learning method that comprises:

sequentially updating, based on the probabilistic likelihood, each of the universal discriminant function parameters and the adaptation parameters for maximum learning under the condition of using the adaptation functions, both the universal discriminant function parameters and the adaptation parameters being updated concurrently, determining whether the sequential updating operation is to discontinued, and using the obtained universal discriminant function parameters as trained values in a case where the updating operation is discontinued.

* * * * *